United States Patent
Dallas et al.

(10) Patent No.: US 8,806,591 B2
(45) Date of Patent: Aug. 12, 2014

(54) AUTHENTICATION RISK EVALUATION

(75) Inventors: Charles Dallas, Colorado Springs, CO (US); Mohammad Reza Tayebnejad, Colorado Springs, CO (US); Ken Mckeever, Denver, CO (US); Vidhyaprakash Ramachandran, Richardson, TX (US); Paul Andrew Donfried, Richmond, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 343 days.

(21) Appl. No.: 12/986,538

(22) Filed: Jan. 7, 2011

(65) Prior Publication Data
US 2012/0180124 A1  Jul. 12, 2012

(51) Int. Cl.
*G06F 21/00* (2013.01)
*H04L 9/32* (2006.01)

(52) U.S. Cl.
USPC .............................................. 726/6; 726/22

(58) Field of Classification Search
USPC .......................................................... 726/22
See application file for complete search history.

(56) References Cited

U.S. PATENT DOCUMENTS

| 7,908,645 | B2 * | 3/2011 | Varghese et al. | 726/4 |
| 2006/0020814 | A1 * | 1/2006 | Lieblich et al. | 713/182 |

OTHER PUBLICATIONS

NIST Special Publication 800-63-1 dated Dec. 8, 2008 (108 pages).

\* cited by examiner

*Primary Examiner* — Gilberto Barron, Jr.
*Assistant Examiner* — Devin Almeida (57) ABSTRACT

A computer is configured to receive an authentication request that identifies one or more authentication form factors, and for each form factor identified, further identifies at least one parameter. The computer is further configured to generate a risk score for the authentication request using the parameter, the risk score being based at least in part on a complexity associated with each of the one or more authentication form factors. The computer is further configured to provide the risk score to a requester.

22 Claims, 6 Drawing Sheets

Fig. 1

| Length | Nochk | Nochk +Sps | Nochk +Dig | Nochk +Cap | Nochk +Dig+Sps | Nochk +Dig+Cap | Nochk +Sps+Cap | Nochk +Dig+Sps+Cap |
|---|---|---|---|---|---|---|---|---|
| 1 | 4.0 | 4.8 | 4.8 | 5.2 | 5.7 | 6.0 | 6.0 | 6.8 |
| 2 | 6.0 | 7.2 | 7.2 | 7.8 | 8.5 | 9.0 | 9.0 | 10.2 |
| 3 | 8.0 | 8.8 | 8.8 | 9.2 | 9.7 | 10.0 | 10.0 | 10.8 |
| 4 | 10.0 | 10.8 | 10.8 | 11.2 | 11.7 | 12.0 | 12.0 | 12.8 |
| 5 | 12.0 | 13.2 | 13.2 | 13.8 | 14.5 | 15.0 | 15.0 | 16.2 |
| 6 | 14.0 | 15.2 | 15.2 | 15.8 | 16.5 | 17.0 | 17.0 | 18.2 |
| 7 | 16.0 | 18.1 | 18.1 | 18.9 | 20.1 | 21.0 | 21.0 | 23.1 |
| 8 | 18.0 | 20.5 | 20.5 | 21.5 | 23.0 | 24.0 | 24.0 | 26.5 |
| 9 | 19.5 | 22.0 | 22.0 | 23.0 | 24.5 | 25.5 | 25.5 | 28.0 |
| 10 | 21.0 | 23.5 | 23.5 | 24.5 | 26.0 | 27.0 | 27.0 | 29.5 |
| 11 | 22.5 | 25.0 | 25.0 | 26.0 | 27.5 | 28.5 | 28.5 | 31.0 |
| 12 | 24.0 | 26.5 | 26.5 | 27.5 | 29.0 | 30.0 | 30.0 | 32.5 |
| 13 | 25.5 | 28.0 | 28.0 | 29.0 | 30.5 | 31.5 | 31.5 | 34.0 |
| 14 | 27.0 | 29.5 | 29.5 | 30.5 | 32.0 | 33.0 | 33.0 | 35.5 |
| 15 | 28.5 | 31.0 | 31.0 | 32.0 | 33.5 | 34.5 | 34.5 | 37.0 |
| 16 | 30.0 | 32.5 | 32.5 | 33.5 | 35.0 | 36.0 | 36.0 | 38.5 |

Fig. 2A

| length | Dict | Dict +Sps | Dict +Dig | Dict +Cap | Dict +Dig+Sps | Dict +Dig+Cap | Dict +Sps+Cap | Dict +Dig+Sps+Cap |
|---|---|---|---|---|---|---|---|---|
| 1 | 5.0 | 5.8 | 5.8 | 6.2 | 6.7 | 7.0 | 7.0 | 7.8 |
| 2 | 7.0 | 8.2 | 8.2 | 8.8 | 9.5 | 10.0 | 10.0 | 11.2 |
| 3 | 11.0 | 11.8 | 11.8 | 12.2 | 12.7 | 13.0 | 13.0 | 13.8 |
| 4 | 14.0 | 14.8 | 14.8 | 15.2 | 15.7 | 16.0 | 16.0 | 16.8 |
| 5 | 17.0 | 18.2 | 18.2 | 18.8 | 19.5 | 20.0 | 20.0 | 21.2 |
| 6 | 20.0 | 21.2 | 21.2 | 21.8 | 22.5 | 23.0 | 23.0 | 24.2 |
| 7 | 22.0 | 24.1 | 24.1 | 24.9 | 26.1 | 27.0 | 27.0 | 29.1 |
| 8 | 24.0 | 26.5 | 26.5 | 27.5 | 29.0 | 30.0 | 30.0 | 32.5 |
| 9 | 25.0 | 27.5 | 27.5 | 28.5 | 30.0 | 31.0 | 31.0 | 33.5 |
| 10 | 26.0 | 28.5 | 28.5 | 29.5 | 31.0 | 32.0 | 32.0 | 34.5 |
| 11 | 27.0 | 29.5 | 29.5 | 30.5 | 32.0 | 33.0 | 33.0 | 35.5 |
| 12 | 28.0 | 30.5 | 30.5 | 31.5 | 33.0 | 34.0 | 34.0 | 36.5 |
| 13 | 29.0 | 31.5 | 31.5 | 32.5 | 34.0 | 35.0 | 35.0 | 37.5 |
| 14 | 30.0 | 32.5 | 32.5 | 33.5 | 35.0 | 36.0 | 36.0 | 38.5 |
| 15 | 31.0 | 33.5 | 33.5 | 34.5 | 36.0 | 37.0 | 37.0 | 39.5 |
| 16 | 32.0 | 34.5 | 34.5 | 35.5 | 37.0 | 38.0 | 38.0 | 40.5 |

AUTHENTICATION RISK EVALUATION

BACKGROUND INFORMATION

Authentication to various applications may be performed according to a variety of authentication form factors, such as user password authentication (UPA), static knowledge-based authentication (SKBA or, herein, simply KBA), one-time password authentication (OTA, or sometimes OTP), etc. According to a UPA form factor, a user provides a token, e.g., a password, that the application compares to a pre-stored token associated with that user (the token sometimes being stored in a hashed form). According to a static KBA form factor, a user successfully provides evidence of certain knowledge, e.g., answers a "secret question" or the like, to obtain authentication to the application. According to an OTA form factor, a hardware and software device is somehow synchronized with the application, e.g., a device sometimes referred to as a security token or the like, is used to generate a one-time token, or password, that the application may compare to an expected value. OTA may require a user token, generally called a personal identification number (PIN), or may refer to a single token transmitted to a user, e.g., via mail, email, telephone, etc. In addition, various authentication form factors such as those mentioned above may be used in various combinations with one another.

Different authentication form factors present varying levels of reliability, and therefore varying levels of risk of being breached by an attacker. Unfortunately, mechanisms for adequately evaluating such risk, and for determining when an authentication method is sufficient, are presently lacking.

DETAILED DESCRIPTION OF PREFERRED EMBODIMENTS

Figure 1:
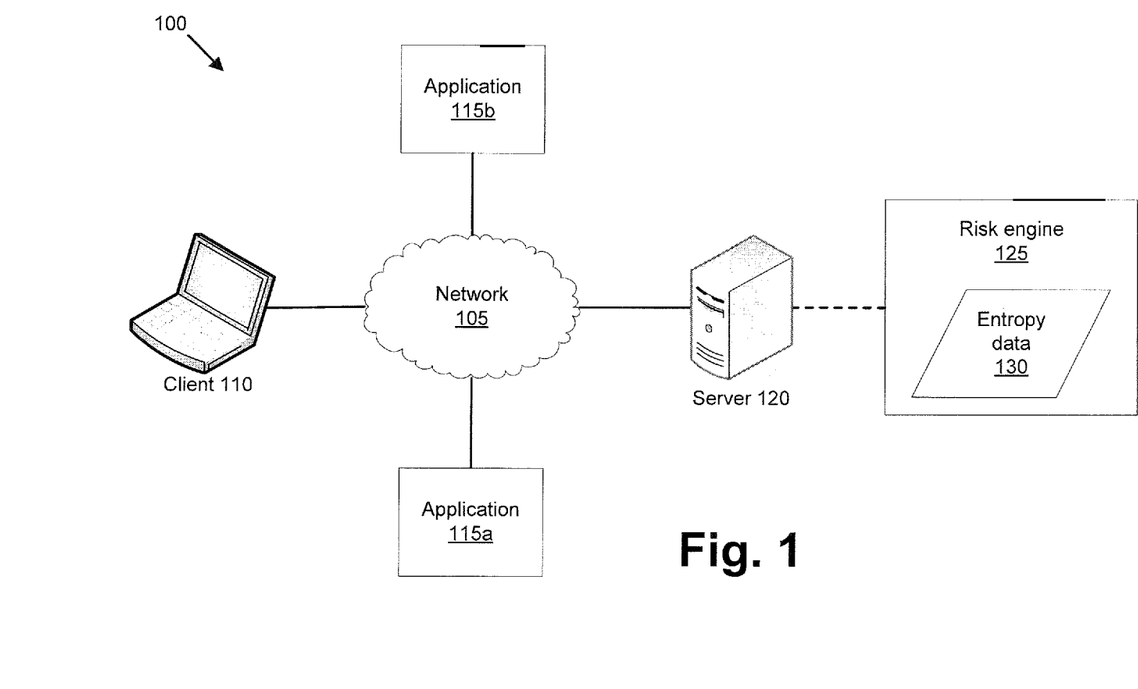
FIG. 1 illustrates an exemplary system for providing a risk score evaluation for one or more applications.

FIG. 1 illustrates an exemplary system 100 that includes a network 105 through which a client 110 may access various applications 115. The term "application" is used herein to denote any kind of content or software application that may be accessed via a network such as the Internet, e.g., a webpage, media content such as audio or video, interactive applications such as e-commerce applications, banking applications, various specialized applications, etc. Applications 115 may require various types and combinations of authentication mechanisms, e.g., UPA, KBA, OTA, etc., to be used before a client 110 is permitted to access the application 115.

A scoring server 120 hosts a risk engine 125, e.g., the risk engine 125 may be stored on a computer readable medium included in or accessible by the server 120, and generally includes a set of instructions executable by one or more processors of server 120. When a client 110 seeks authentication to an application 115, the risk engine 125 may be employed to provide an evaluation, e.g., a score, of risk of permitting the client 110 to access the application 115. For example, such risk may be evaluated according to form factors or other factors used for the authentication. A client 110 may then be permitted or denied access to the application 115 according to the evaluation provided by risk engine 125.

Further, factors other than a risk score may be used in evaluating risk associated with an authentication account. For example, historical data associated with a network address or other location from which an authentication attempt is made may factor into a risk evaluation, and may be used as a factor in determining a risk score. Historical data could include a number of prior attempts associated with a location, whether such prior attempts were successful or unsuccessful, or whether the historical data includes any indications that such attempts were suspicious, e.g., a large number of attempts were made in a short period of time, etc. Such use of historical data is sometimes referred to as "IP reputation" analysis; that is, a risk score may be assigned based in whole or in part on a determination that a network address or other location from which an authentication attempt is made has been associated with malicious attempts in the past.

Another factor that may be used in evaluating risk is sometimes referred to as "geo-velocity." That is, if first attempt with a particular username is made from a first network address, and then, within a short period of time, e.g., a matter of a few minutes, a second attempt with the username is made from a second network address, wherein the first and second network addresses are known or can be determined to be geographically distant from one another, e.g., in different states or countries, such scenario may provide an indicator of a high level of risk associated with the authentication attempts.

Moreover, a location from which an authentication request is made may be a factor in evaluating risk associated with the authentication attempts. For example, a network address associated with certain countries may indicate a heightened risk score. That is, IP reputation may be associated with an address or block of address known to be in a country, or portion of a country, associated with potentially malicious activity.

Authentication form factors may be combined in various ways to perform authentication to an application 115. For example, authentication form factors may be presented in sequence, in parallel, a user may be requested to answer a certain number of questions in a pool of questions in a KBA scenario, etc.

Sequential authentication refers to a type of authentication in which a user of an application 115 is presented with multiple authentication form factors one after the other, i.e., in a sequence. That is, the user is presented with multiple requests for information, and is required to submit correct information in response to each request before being presented with the next request. Thus, when authentication fails, sequential authentication inherently notifies the user as to a specific authentication form factor with respect to which authentication has failed.

An example of sequential authentication would be for an application 115 to request a user name and password, and, if the correct username and password are provided, then requesting, in a subsequent screen of a user interface, a mother's maiden name, elementary school attended, father's middle name, name of pet, etc. If a correct user name an password are not provided, then the application 115 would deny access, and would not proceed to request the social security number or other identifying information. Because it identifies failure points to a user in an authentication process, sequential authentication allows an attacker to isolate and focus on a factor that the attacker has failed to guess correctly. Note that sequential factors are always presented in sequence, i.e., one after the other. Factors presented individually cannot be considered sequential because an attacker could then attempt to guess the factors at the same time and independently, and could thus guess the individual factors more quickly.

Parallel authentication refers to a type of authentication in which a user of an application 115 is presented with multiple authentication form factors at substantially the same time, i.e., in parallel. That is, the user is presented with requests for information and is required to submit correct information in response to all of the requests at the same time, e.g., via a single screen of a user interface. If any of the information is incorrect, the authentication fails and user generally has no way to determine which of the information was incorrect and resulted in the failure. Parallel factors must always be presented in parallel, else the benefit of having the user supply multiple factors at the same time will be lost.

An example of parallel authentication would be for an application 115 to request a user name and password, and, at the same time, request a social security number or other identifying information. Access to the application 115 will be granted only if all requested information is correct, and will be denied, with no explanation as to which information is incorrect, if any of the requested information is incorrect.

KBA is a series of authentication form factors in which a user is presented with a number K of questions out of a pool of N questions. For example, a pool of questions could include a series of questions requesting the user to provide personal information known about the user and the stored in a data store. Additionally or alternatively, a pool of questions could include user-provided answers, e.g., mother's maiden name, elementary school attended, father's middle name, name of pet, etc. A subset of the questions could be selected from the pool and provided to the user for response.

One important operation that may be performed by risk engine 125 is determining complexity associated with a password or token. "Complexity" as discussed herein generally refers to a number of combinations of characters in a token that either possibly could be presented, or are likely to be presented. Where entropy is estimated based on one of the tables in FIGS. 2A and 2B, discussed below, complexity is $2^{Entropy}$ (2 to the power of estimated entropy). Further, where multiple form factors are combined, complexity is some combination of the complexities of the individual form factors. For example, in general, the complexity of an authentication that consists of parallel form factors is a multiplicative factor of the respective complexities of the individual form factors in the authentication. Computing a complexity for a sequential authentication may include performing probability analyses and combining probabilities associated with individual form factors in the sequence. Further, because the likely answer space for many tokens is smaller than the number of possible combinations of tokens, risk engine 125 further generally includes, or is able to access, entropy data 130.

"Entropy" as used herein has the meaning generally ascribed to that term in information theory (as opposed to the meaning of "entropy" in thermodynamics). That is, entropy is generally a calculation of a number of bits of data that are required to generate a string of a given length in a given language. A general formula for entropy H associated with a token is:

$$H = \log_2(b^l) \quad \text{(Eq. 1)},$$

where l is the length of the token, and b is the number of characters in the alphabet used to write the token. Thus, reference is sometimes made to a number of bits of entropy associated with a string.

The general formula for entropy provided by Equation 1 assumes that a string may be randomly generated. In practice, tokens are often words, e.g., English-language words, chosen by a user of an application 115. Accordingly, for tokens of different lengths, a value for entropy that is less than the value that would be obtained from Equation 1 may be estimated.

For example, Special Publication 800-63-1 published in Dec. 8, 2008 by the National Institute of Standards and Technology within the United States Department of Commerce (hereinafter "Special Publication 800-63"), fully incorporated by reference herein in its entirety, provides a "Table A.1—Estimated Password Guessing Entropy in bits vs. Password Length." Values provided in this table, which assumes a 94 character alphabet, may be used to determine entropy to be associated with a token of a given length under various conditions. Further, values in this table may be used as a basis for extrapolating and interpolating other entropy values, such as is illustrated in FIGS. 2A and 2B.

Figure 2A:
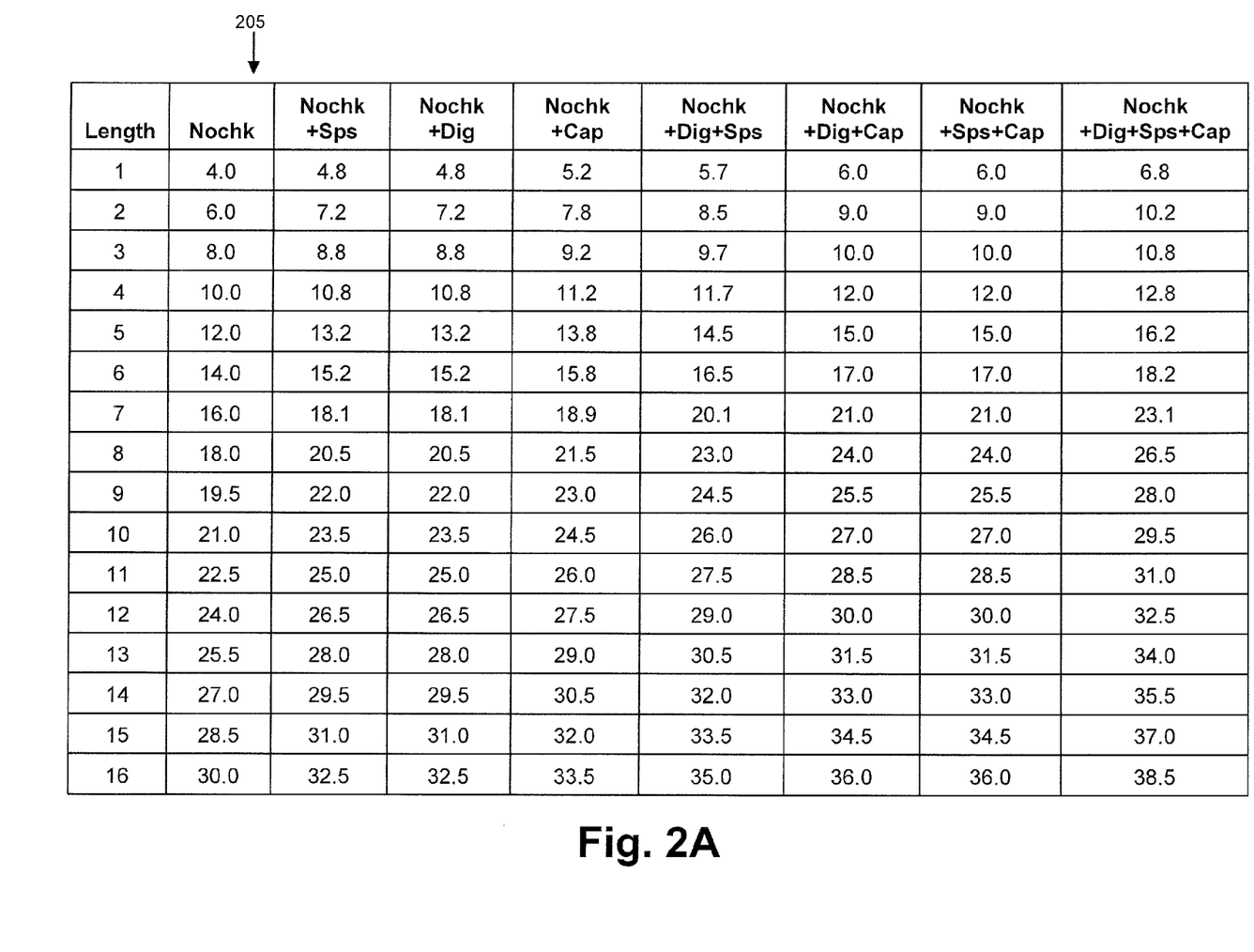
FIG. 2A illustrates a first exemplary extended entropy table.
Figure 2B:
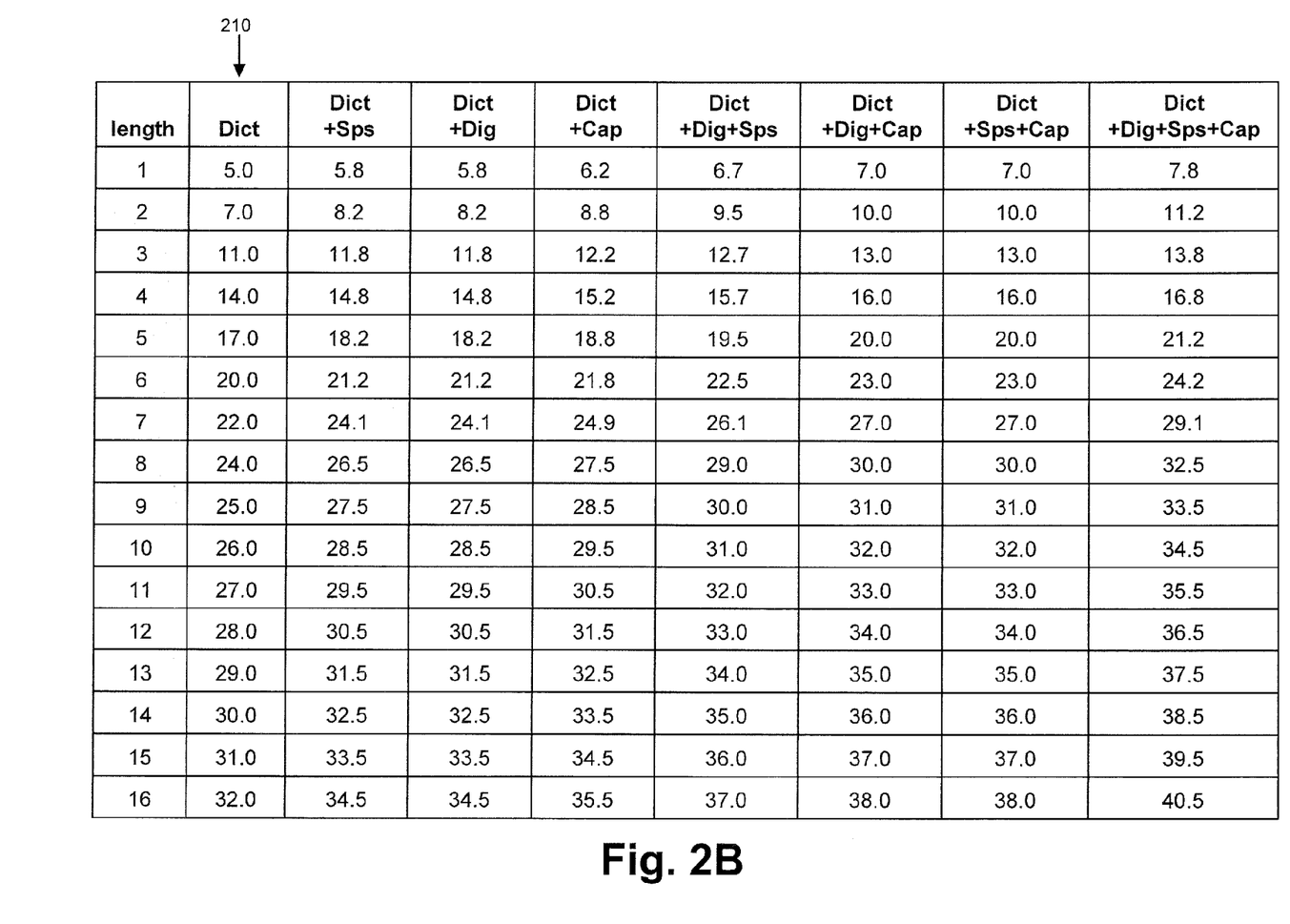
FIG. 2B illustrates a second exemplary extended entropy table.

FIGS. 2A and 2B respectively include extended entropy tables 205 and 210 that estimate entropy values for tokens ranging from 1 to 16 characters in length, where the tokens are in the English language. The expression "Nochk" in table 205 means that the token is not subjected to a dictionary check when it is created. The expression "Dict" in table 210 means that a token that was subjected to a dictionary check when it was created, that is, a user was not allowed to create a token if the token was found in a dictionary. As can be seen, entropy values in table 210 are generally higher than entropy values in table 205 because excluding tokens found in a dictionary, as a practical matter, enlarges the number of possible tokens that are likely to be selected by a user.

Other expressions used in tables 205 and 210 have the following meanings, i.e., are associated with what are sometimes referred to as "composition rules" as follows. "Sps" means that the provided entropy value is for tokens that include both characters of the English alphabet as well as special characters. "Dig" means that the provided entropy value is for tokens that include both characters of the English alphabet as well as digits zero through nine. "Cap" means that the provided entropy value is for tokens that are case-sensitive, e.g., that include uppercase as well as lower case characters of the English alphabet. Also, as can be seen, columns of tables 205 and 210 also associate entropy values with combinations of the various composition rules.

The network 105 may be a packet switched network such as an internet protocol (IP) network. As such, network 105 generally uses one or more known protocols for transporting data, such as user datagram protocol (UDP), transport control protocol (TCP), hypertext transfer protocol (HTTP), etc. Further, network 105 may include a variety of networks such as a wide area network (WAN), e.g., the Internet, a local area network (LAN), etc. Packet switched network 105 may be used to transport a variety of data, including multimedia data such as audio data and video data.

Computing devices such as client 110, server 120, etc. may employ any of a number of computer operating systems known to those skilled in the art, including, but by no means limited to, known versions and/or varieties of the Microsoft Windows® operating system, the Unix operating system (e.g., the Solaris® operating system distributed by Sun Microsystems of Menlo Park, Calif.), the AIX UNIX operating system distributed by International Business Machines of Armonk, N.Y., and the Linux operating system. Computing devices may include any one of a number of computing devices known to those skilled in the art, including, without limitation, a computer workstation, a desktop, notebook, laptop, or handheld computer, or some other computing device known to those skilled in the art.

Computing devices such as the foregoing generally each include instructions executable by one or more computing devices such as those listed above. Computer-executable instructions may be compiled or interpreted from computer programs created using a variety of programming languages and/or technologies known to those skilled in the art, including, without limitation, and either alone or in combination, Java™, C, C++, Visual Basic, Java Script, Perl, etc. In general, a processor (e.g., a microprocessor) receives instructions, e.g., from a memory, a computer-readable medium, etc., and executes these instructions, thereby performing one or more processes, including one or more of the processes described herein. Such instructions and other data may be stored and transmitted using a variety of known computer-readable media.

A computer-readable medium includes any medium that participates in providing data (e.g., instructions), which may be read by a computer. Such a medium may take many forms, including, but not limited to, non-volatile media, volatile media, and transmission media. Non-volatile media include, for example, optical or magnetic disks and other persistent memory. Volatile media include dynamic random access memory (DRAM), which typically constitutes a main memory. Transmission media include coaxial cables, copper wire and fiber optics, including the wires that comprise a system bus coupled to the processor. Transmission media may include or convey acoustic waves, light waves and electromagnetic emissions, such as those generated during radio frequency (RF) and infrared (IR) data communications. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, a carrier wave as described hereinafter, or any other medium from which a computer can read.

Figure 3:
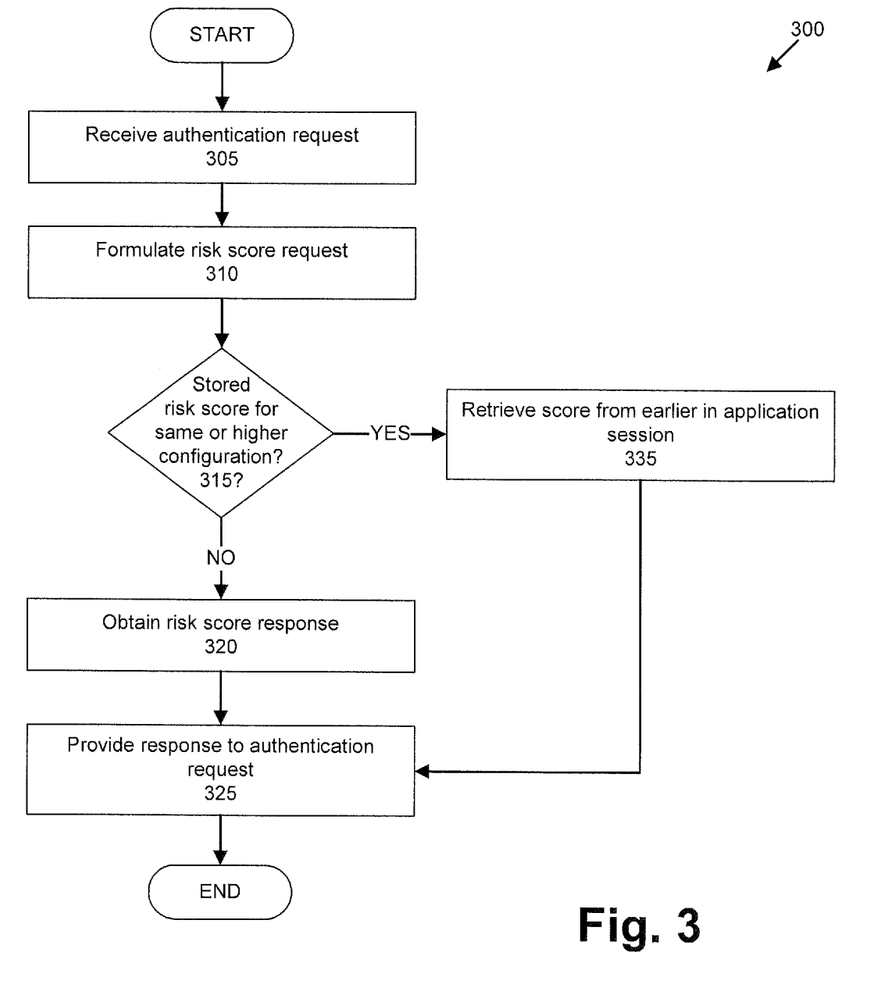
FIG. 3 illustrates an exemplary process for responding to an authentication request.

FIG. 3 illustrates an exemplary process 300 for responding to an authentication request. The process 300 begins in a step 305, in which scoring server 120 receives an authentication request forwarded from an application 115, e.g., according to a request received from a client 110. The authentication request may identify one or more form factors to be used in the authentication, e.g., UPA, KBA, OTA, or some combination thereof, along with parameters for each form factor. In one implementation, input provided to risk engine 125, e.g., received from a client 110, is formatted according to extensible markup language (XML) or the like, and includes a list of form factors and the parameters corresponding to each form factor. For example, an exemplary XML string of input in one implementation is as follows:

```
<RiskEngineScoreQuery>
    <FormFactor type="UPA" length="8" lock-out="3"
    life-time="365"/>
    <FormFactor type="OTA" length="6" lock-out="1440"
    life-time="5"/>
</RiskEngineScoreQuery>
```

Possible parameters, along with default values that risk engine 125 may use if the parameter is needed but has not been supplied in the authentication request, are provided in Table 1 below. Table 1 also specifies the form factor(s) to which each parameter may be applicable.

TABLE 1

| Parameter | Default | Form Factor | Notes |
|---|---|---|---|
| lock-out | 3 | UPA/OTA/KBA | number of attempts before lock out |
| lock-out time | 60 | UPA/OTA/KBA | duration of lock out in seconds |
| password length | 4 | UPA | password length |
| token length | 4 | OTA | token length |
| token complexity | 10 | OTA | size of the character space for token |
| answer space | 12 | SKBA | size of months in the year |
| OTA pin length | 0 | OTA | pin may not be required for OTA authentication (single factor OTA) |
| attempts rate | 60 | UPA/OTA/KBA | number of online authentication attempts per minute if no lockout is provided |
| lifetime | 365 | UPA/OTA/KBA | token lifetime in days |

Next, in step 310, the scoring server 120, e.g., according to instructions included in risk engine 125, formulates a risk score request. That is, the risk engine 125 formulates the parameters, according to parameters received in the authentication request or according to default values, according to which the received authentication request may be evaluated. Further, the risk engine 125 may consider other factors, such as a type of authentication, e.g., UPA, KBA, OTA, etc., whether authentication form factors such as the foregoing are being combined, and, if so, how they are being combined (e.g., sequentially or in parallel, or as K out of N possible questions in a KBA scenario), possibly along with other factors, such as discussed above, e.g., a geographic location of the clients 110, geo-velocity concerns, IP reputation concerns, whether the client 110, or a user of the client 110, have made prior, e.g., unsuccessful, attempts at authentication, etc., and a type of client 110, e.g., smartphone, desktop computer, etc.

Next, in step 315, which is optional and may be omitted, risk engine 125 determines whether, earlier in a session with the application 115 from which the authentication request was received in step 305, a risk score has already been stored for a configuration of parameters that are identical to, or associated with a higher authentication level than, the parameters formulated in step 310. An authentication request, i.e. an authentication form factor or combination of factors, may considered to be at a higher level than, or to exceed, another form factor or combination of factors according to rankings stored in scoring server 120, or a data store associated therewith. For example, OTA is generally ranked at a higher level than UPA, which in turn is generally ranked at a higher level than KBA.

Accordingly, to take a simple example, if an authentication request is for UPA authentication, and risk engine 125 has, earlier in an application 115 session, already stored a score for OTA authentication, then a "yes" determination would be made in step 315. Similarly, a "yes" determination may be made in step 315 if an authentication request includes UPA and KBA authentication factors, and the risk engine 125 has previously stored a score relating to KBA authentication alone. A "no" determination is made in step 315 if risk engine 125 has not previously stored a risk score for a same or lower configuration of authentication parameters as formulated in step 310.

If the determination of step 315 is "yes," then step 335 is executed next. In step 335, risk engine 125 retrieves the stored risk score, and process 300 proceeds to step 325.

Figure 4A:
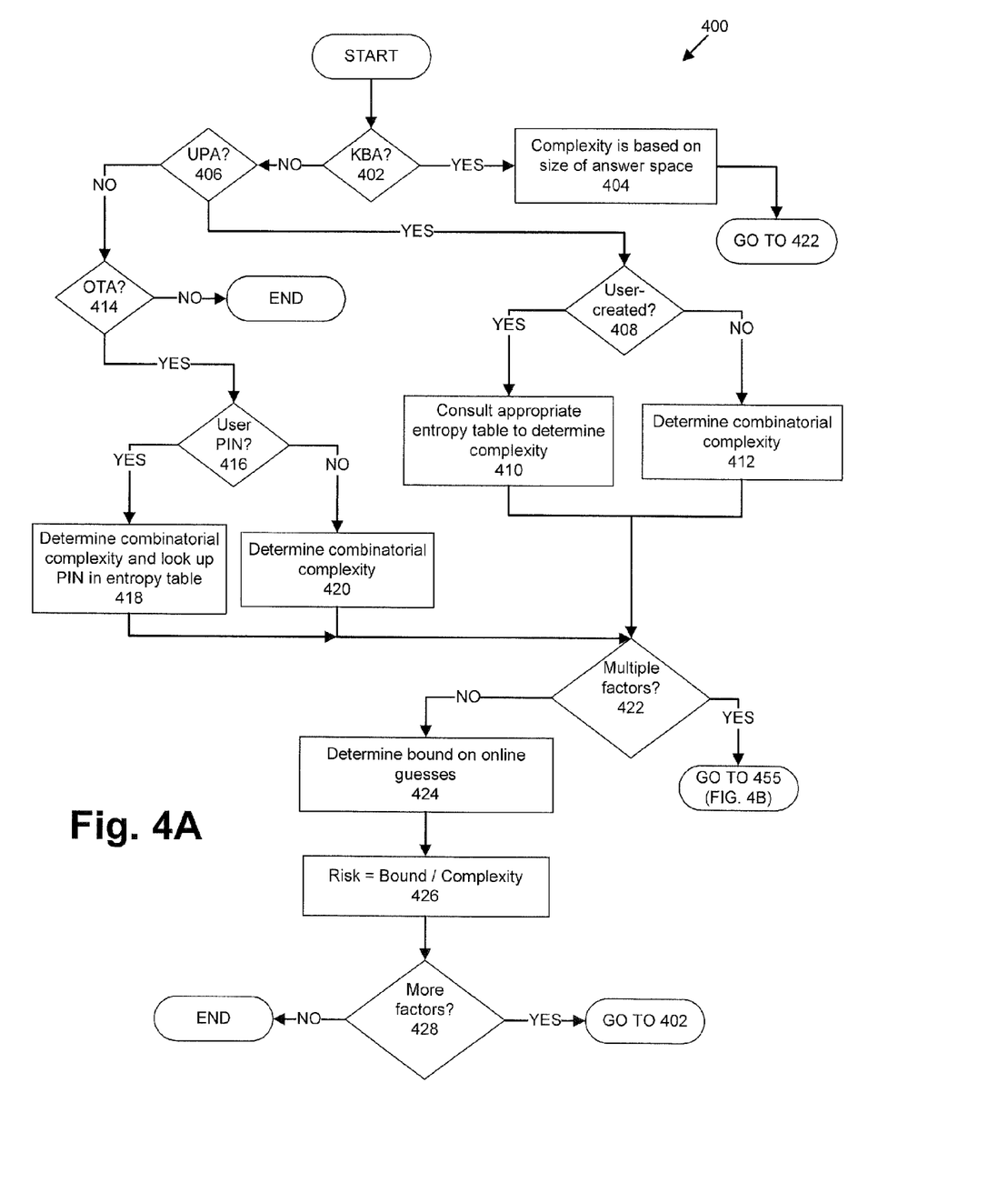
FIG. 4A illustrates a first portion of an exemplary process for generating a risk score that may be used to respond to an authentication request.

If a determination of step 315 is "no," then step 320 is executed next. In step 320, risk engine 125 obtains a risk score associated with the configuration of parameters formulated in step 310. An exemplary process for obtaining the risk score is discussed in more detail below with respect to FIG. 4.

Step 325 may be executed following either step 320 or step 335. In step 325, server 120 provides a response to the authentication request received in step 325. This response may be in the form of a risk score, e.g., a numeric value reflecting a risk associated with the form factor or factors indicated in the authentication request received in step 305. For example, the numeric value may reflect a risk that an attacker, rather than a legitimate user, is seeking access to the application 115. The response to the authentication request may additionally or alternatively include an indicator of a risk level, e.g., "level 1," "level 3,", etc. For example, various risk levels may be associated with ranges of numeric values of risk. In one implementation, risk scores are correlated to four levels of risk, referred to as NIST levels, corresponding to authentication levels set forth in Special Publication 800-63. For example a risk score of less than $2^{-10}$ could satisfy NIST Level 1, a risk score of less than $2^{-14}$ could satisfy NIST Level 2, etc. Moreover, NIST levels take into account a type of form factor, e.g., as discussed in the next paragraph. Further, as discussed above, a risk score may be further adjusted or based in whole or in part on other factors, such as geo-velocity, IP reputation, location, etc.

Factors other than a risk score may be included in, or used to formulate, the response of step 325. For example, in one implementation, a NIST Level 3 response, as discussed in the previous paragraph, is provided only where UPA or KBA are used in combination with OTA, achieve a risk score at least less than that associated with Level 2, and the lifetime of the OTA token does not exceed a predetermined time period, e.g., 60 minutes. Further in this exemplary implementation, Level 4 is satisfied only where OTA is used with the token being provided by hardware that requires a user personal identification number (PIN), and a risk score is achieved that is at least less than that associated with Level 2.

As with the input to risk engine 125, the output may also be provided according to XML. For example, exemplary XML output in one implementation is as follows:

```
<RiskEngineScoreResult>
    <RiskScore nist-level="2" score="6.10314311870613e-
    05">
</RiskEngineScoreResult>
```

Following step 325, process 300 ends.

FIG. 4A illustrates a first portion of an exemplary process 400 for generating a risk score that may be used to respond to an authentication request. Process 400 is generally carried out according to instructions included in risk engine 125, said instructions being executed by a processor of server 120.

An authentication request, as mentioned above, may include one or more than one authentication form factors. The process 400 begins in a step 402 with respect to a first, and perhaps sole, authentication form factor by determining whether the authentication form factor under consideration uses knowledge-based authentication (KBA). If the determination of step 402 is "yes," then step 404 is executed next. Otherwise, step 406 is executed next.

In step 404, risk engine 125 determines a complexity associated with the form factor according to the size of the answer space associated with the KBA form factor. For example, KBA may include asking a "secret question" such as "What is your mother's first name?" Accordingly, the size of the answer space associated with the KBA form factor could be a number of likely female first names in a language or country likely to be associated with a user of client 110. Following step 404, process 400 proceeds to step 422.

In step 406, risk engine 125 determines whether the form factor includes user password authentication (UPA). If yes, process 400 proceeds to step 408. Otherwise, step 414 is executed next.

In step 408, risk engine 125 determines whether the password used in the UPA was user created or machine created. If the password was created by the user, then step 410 is executed next. Otherwise, process 400 proceeds to step 412.

In step 410, risk engine 125 determines a complexity for a user-created password. Accordingly, risk engine 125 consults entropy data 130 to determine a complexity to be associated with the form factor. That is, complexity may be determined to be one of the entropy values provided in one of tables 205 or 210, as appropriate for the length of the token and the composition rules according to which the token was created. Step 422 follows step 410.

In step 412, risk engine 125 determines a complexity for a machine-created password. In this case, complexity is determined to be a combinatorial complexity based on token length and size of the character space for the token, e.g., a number of letters in an alphabet in which a token was created. Step 422 follows step 410.

If risk engine 125 determines in step 406 that the form factor does not use UPA, then step 414 follows step 406. In step 414, risk engine 125 determines whether the form factor is an OTA form factor. If not, process 400 ends, possibly after generating an error message or other indication of unexpected input. Otherwise, step 416 is executed next.

In step 416, risk engine 125 determines whether the form factor includes a user personal identification number (PIN) or the like in conjunction with the OTA password. If the form factor does include a user PIN, then step 418 is executed next. Otherwise, step 420 is executed next.

In step 418, complexity is determined to be the sum of a combinatorial complexity based on token length and size of the character space for the token, e.g., a number of letters in an alphabet in which a token was created and a complexity associated with the PIN as determined by appropriate entropy data 130. Step 422 is executed following step 418

In step 420, complexity is determined to be a combinatorial complexity based on token length and size of the character space for the token. Step 422 is executed following step 420.

Next, in step 422, risk engine 125 determines whether the authentication request includes multiple form factors, e.g., parallel or sequential form factors, or just one form factor. If multiple factors are included, step 455 (illustrated in FIG. 4B) is executed next. Otherwise, step 424 is executed next.

In step 424, risk engine 125 determines an upper bound B on the number of guesses that an attacker may make to recover a token. In general, the bound is constrained by the lifetime of the token, the number of attempts, or lockout strikes, that may be permitted before the attacker is locked out from further attacks, as well as the lockout time, i.e., the time period for which a lockout will apply. Accordingly, the bound B may be computed according to the following formula:

$$B=(\text{lifetime})(\text{lockout strikes})/(\text{lockout time}) \quad \text{(Eq. 2).}$$

Risk engine 125 may be provided with default values for the foregoing variables, e.g., "lifetime" may be set to one year, "lockout strikes" may be set to 10, "lockout time" may be set to one hour, etc. However, values for these variables may be provided to risk engine 125, e.g., as parameters to an authentication request, or may be configured via a user interface provided to a user of the server 120, and stored in an associated data store.

Note that "lifetime" as used herein generally refers to an effective lifetime of a token, not necessarily to an actual lifetime. That is, a token may in reality have an unlimited lifetime. However, for purposes of risk calculations, assigning an unlimited lifetime to a token would result in an evaluation of unlimited risk. Thus, even though a token may be valid for longer than the assigned lifetime, risk engine 125 assumes a lifetime of a predefined period, e.g., one year, on the theory that an attacker only has a limited amount of time and resources to attempt to breach a token.

In step 426, which follows step 424 a risk score is computed for a single factor authentication according to the formula:

$$R=B/C \quad \text{(Eq. 3),}$$

where B is the bound computed as described above with respect to step 424, and C is the complexity determined as described above with respect to one of steps 415, 420, or 425. If multiple independent (i.e., not sequential or parallel) factors are processed, i.e., if step 426 is being carried out in a second or subsequent iteration of process 400, then the risk score computed in this step is multiplied by the risk score from one or more prior iterations of proecess 400.

Step 428 follows step 426. In step 428, risk engine 125 determines whether an authentication request includes further independent factors that have not yet been processed. For example, a parallel authentication factor could be followed by a simpe request for a password, etc. If so, process 400 returns to step 402 to process the next factor. Otherwise, the process 400 ends.

Figure 4B:
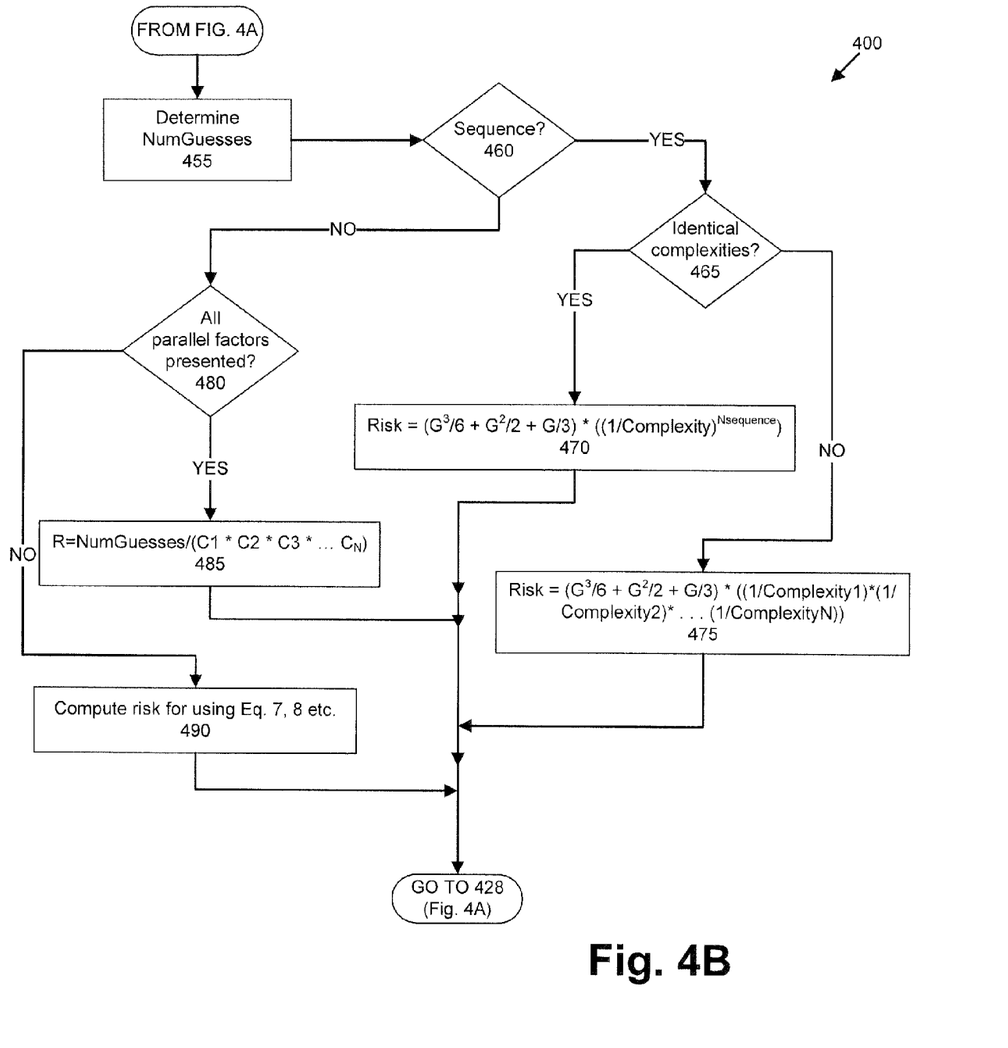
FIG. 4B illustrates a second portion of an exemplary process for generating a risk score that may be used to respond to an authentication request.

FIG. 4B illustrates a second portion of the exemplary process 400 for generating a risk score that may be used to respond to an authentication request, beginning with step 455, which may follow step 426, as described above.

In step 455, risk engine 125 determines an upper bound on a number of guesses (NumGuesses) that an attacker may be able to make during the lifetime of a token required for the authentication request. This number, used as described below in determining a risk score for authentication requests that include multiple authentication form factors, may be provided as a parameter with the authentication request, or may be configured by a user of server 120, and stored in an associated data store, or risk engine 125 could use a default value.

Step 460 is reached if risk engine 125 has determined that the authentication request being processed includes multiple authentication form factors. Accordingly, in step 460, risk engine 125 determines whether the multiple authentication form factors are presented in a sequence, i.e., whether a first factor is presented, then a second, then possibly a third, fourth, fifth, etc., where each of the factors are presented independently of one another. If the multiple authentication form factors are presented in a sequence, then step 465 is executed next. Otherwise, step 480 is executed next.

Next, in step 465, risk engine 125 determines whether the complexity associated with each of the form factors in the authentication request is identical with the complexity associated with every other form factor in the request, or whether at least one complexity is different. If the complexities are all identical, step 470 is executed next. Otherwise, step 475 is executed next.

In step 470, risk engine 125 computes a risk score according to the following formula:

$$R=(G^3/6+G^2/2+G/3)*((1/C)^N) \quad \text{(Eq. 4),}$$

where R is the risk score, G=NumGuesses−2, C is the complexity determined as described above with respect to one of steps 415, 420, or 425, and N is the number of form factors included in the authentication request. Process 400 ends after step 470 is executed.

In step 475, risk engine 125 computes a risk score according to the following formula:

$$R=(G^3/6+G^2/2+G/3)*((1/C_1)*(1/C_2)\ldots(RC_N)) \quad \text{(Eq. 5),}$$

where R is the risk score, G=NumGuesses−2, N is the number of form factors included in the authentication request, and $C_1 \ldots C_N$ are the respective complexities for each of the form factors determined as described above with respect to one of steps 415, 420, or 425. Note that Equation 5 provides for a more general case of the scenario addressed by Equation 4. That is, Equation 4 addressed the special case in which each of the multiple form factors have identical complexities. Process 400 ends after step 475 is executed.

Step 480 follows step 455 if risk engine 125 determines that the multiple form factors in the authentication request are not presented in sequence. In step 480, risk engine 125 determines that, inasmuch as the form factors must be presented in parallel because they are not in sequence, whether all of the questions in a KBA pool are used, or whether a subset of less than the total number of questions are selected, e.g., randomly, and presented in parallel. If all of the questions are presented in parallel, then step 485 is executed next. Otherwise, step 490 is executed next.

In step 485, the multiple form factors in the authentication request having been determined to include all questions in a KBA pool presented in parallel, risk engine 125 computes a risk score according to the following formula:

$$R=\text{NumGuesses}/(C1*C2*C3*\ldots C_N) \quad \text{(Eq. 6),}$$

where R is the risk score, N is the number of form factors included in the authentication request, and C is the complexity for each of the form factors determined as described above with respect to one of steps 415, 420, or 425. Process 400 ends after step 485 is executed.

In step 490, which is executed if the multiple form factors in the authentication request have been determined to be part of a static knowledge-based authentication (KBA) set of form factors, risk engine 125 computes a risk score for the KBA. KBA depends on a question pool that includes a number (N) of questions. A subset (K) of the questions are presented to a user, and must be answered correctly for authentication to succeed. A formula for evaluating risk for multi KBA authentication where K=2 is:

$$\text{Risk} = \sum_{i=1}^{N}\sum_{j=i+1}^{N} \log\left(\frac{\text{complexity}[i,j]}{\left(\text{complexity}[i,j] - \frac{\text{NumGuesses}}{\text{Ncombo}}\right)}\right) \quad \text{(Eq. 7)}$$

where:
complexity[i,j]=AnswerSpace[i]*AnswerSpace[j], and
N and NumGuesses have the meanings given above, and Ncombo is the number of combinations of two objects out of the set of N objects where the order of the two objects is not important.

Likewise, a formula for evaluating risk for multi KBA authentication where K=3 is:

$$\text{Risk} = \sum_{i=1}^{N} \sum_{j=i+1}^{N} \sum_{k=j+1}^{N} \log\left(\frac{\text{complexity}[i, j, k]}{\left(\text{complexity}[i, j, k] - \frac{\text{NumGuesses}}{\text{Ncombo}}\right)}\right) \quad \text{(Eq. 8)}$$

where:
complexity[i, j, k]=AnswerSpace[i]*AnswerSpace[j]*AnswerSpace[k], and N, NumGuesses, and Ncombo have the meanings given above.

From Equations 7 and 8, a formula can be extrapolated for evaluating risk for any number K of N questions in a KBA form factor.

Following step 490, the process 400 returns to step 428, described above.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claimed invention.

Accordingly, it is to be understood that the above description is intended to be illustrative and not restrictive. Many embodiments and applications other than the examples provided would be apparent to those of skill in the art upon reading the above description. The scope of the invention should be determined, not with reference to the above description, but should instead be determined with reference to the appended claims, along with the full scope of equivalents to which such claims are entitled. It is anticipated and intended that future developments will occur in the arts discussed herein, and that the disclosed systems and methods will be incorporated into such future embodiments. In sum, it should be understood that the invention is capable of modification and variation and is limited only by the following claims.

All terms used in the claims are intended to be given their broadest reasonable constructions and their ordinary meanings as understood by those skilled in the art unless an explicit indication to the contrary in made herein. In particular, use of the singular articles such as "a," "the," "said," etc. should be read to recite one or more of the indicated elements unless a claim recites an explicit limitation to the contrary.

What is claimed is:

1. A system comprising:
a computer server having a processor and a memory, the server configured to:
receive an authentication request that identifies one or more authentication form factors, and for each form factor identified, further identifies at least one parameter;
generate a risk score for the authentication request using the parameter, the risk score being based at least in part on a complexity associated with each of the one or more authentication form factors and on an upper bound on a number of guesses that an attacker may make to recover a token before the attacker is locked out from additional attacks, the upper bound based on a lockout time and at least one of a token lifetime, an attempt number, or lockout strikes, the lockout time being a time period for which a lockout will apply;
provide the risk score to a requester; and
when the upper bound is based on the lockout time, token lifetime and lockout strikes, compute the upper bound by dividing a product of the token lifetime and the lockout strikes by the lockout time.

2. The system of claim 1, the server further configured to associate the risk score with a risk level, and to provide the risk level to the requester along with the risk score.

3. The system of claim 1, wherein the one or more authentication form factors includes at least one of one-time authentication (OTA), static knowledge-based authentication (SKBA), and user password authentication (UPA).

4. The system of claim 1, wherein the at least one parameter includes at least one of a location identifier for a source of the authentication request, and the risk score is based at least in part on one of: a determination of geo-velocity and a history relating to the location.

5. The system of claim 1, wherein the at least one parameter includes at least one of a number representing a number of authentication attempts that may be made before a lockout, a lockout duration, a password length, a token length, a token complexity, an answer space, an OTA pin length, an attempts rate, and a token lifetime.

6. The system of claim 1, further comprising a computer client having a processor and a memory, the client configured to send the authentication request to the server.

7. The system of claim 1, the server further configured to store the risk score in a data store along with an identifier or identifiers for the one or more authentication form factors and the at least one parameter.

8. A method, comprising:
receiving, in a computer having a processor and a memory, an authentication request that identifies one or more authentication form factors, and for each form factor identified, further identifies at least one parameter;
generating, in the computer, a risk score for the authentication request using the parameter, the risk score being based at least in part on a complexity associated with each of the one or more authentication form factors and on an upper bound on a number of guesses that an attacker may make to recover a token before the attacker is locked out from additional attacks, the upper bound based on a lockout time and at least one of a token lifetime, an attempt number, or lockout strikes, the lockout time being a time period for which a lockout will apply;
providing the risk score to a requester; and
when the upper bound is based on the lockout time, token lifetime and lockout strikes, compute the upper bound by dividing a product of the token lifetime and the lockout strikes by the lockout time.

9. The method of claim 8, further comprising associating the risk score with a risk level, and providing the risk level to the requester along with the risk score.

10. The method of claim 8, wherein the one or more authentication form factors includes at least one of one-time authentication (OTA), static knowledge-based authentication (SKBA), and user password authentication (UPA).

11. The method of claim 8, wherein the at least one parameter includes at least one of a location identifier for a source of the authentication request, and the risk score is based at least in part on one of: a determination of geo-velocity and a history relating to the location.

12. The method of claim 8, wherein the at least one parameter includes at least one of a number representing a number of authentication attempts that may be made before a lockout, a lockout duration, a password length, a token length, a token complexity, an answer space, an OTA pin length, an attempts rate, and a token lifetime.

13. The method of claim 8, further comprising storing the risk score in a data store along with an identifier or identifiers for the one or more authentication form factors and the at least one parameter.

14. A non-transitory computer-readable medium tangibly embodying computer executable instructions, including instructions for:
receiving, in a computer having a processor and a memory, an authentication request that identifies one or more authentication form factors, and for each form factor identified, further identifies at least one parameter;
generating, in the computer, a risk score for the authentication request using the parameter, the risk score being based at least in part on a complexity associated with each of the one or more authentication form factors and on an upper bound on a number of guesses that an attacker may make to recover a token before the attacker is locked out from additional attacks, the upper bound based on a lockout time and at least one of a token lifetime, an attempt number, or lockout strikes, the lockout time being a time period for which a lockout will apply;
providing the risk score to a requester; and
when the upper bound is based on the lockout time, token lifetime and lockout strikes, compute the upper bound by dividing a product of the token lifetime and the lockout strikes by the lockout time.

15. The medium of claim 14, further comprising instructions for associating the risk score with a risk level, and providing the risk level to the requester along with the risk score.

16. The medium of claim 14, wherein the one or more authentication form factors includes at least one of one-time authentication (OTA), static knowledge-based authentication (SKBA), and user password authentication (UPA).

17. The medium of claim 14, wherein the at least one parameter includes at least one of a location identifier for a source of the authentication request, and the risk score is based at least in part on one of: a determination of geovelocity and a history relating to the location.

18. The medium of claim 14, wherein the at least one parameter includes at least one of a number representing a number of authentication attempts that may be made before a lockout, a lockout duration, a password length, a token length, a token complexity, an answer space, an OTA pin length, an attempts rate, and a token lifetime.

19. The medium of claim 14, further comprising instructions for storing the risk score in a data store along with an identifier or identifiers for the one or more authentication form factors and the at least one parameter.

20. The system of claim 1, wherein the complexity associated with each authentication form factor is an entropy complexity.

21. The system of claim 20, wherein the entropy complexity associated with each authentication form factor is configured to include a number of combinations of characters in a token that could be presented.

22. The system of claim 1, wherein when the authentication request identifies multiple authentication form factors, the complexity is a combination of each complexity of each authentication form factor.

* * * * *